Jan. 5, 1960     F. J. FEAGIN ET AL     2,920,306
CORRELATOR FOR ZERO CROSSING PULSES
OBTAINED FROM SEISMOGRAMS
Filed April 12, 1954     3 Sheets-Sheet 1

INVENTORS.
Frank J. Feagin,
BY Carl R. Wischmeyer,

ATTORNEY.

INVENTORS.
Frank J. Feagin,
BY Carl R. Wischmeyer,

ATTORNEY.

INVENTOR.
Frank J. Feagin,
BY Carl R. Wischmeyer,
ATTORNEY.

United States Patent Office 2,920,306
Patented Jan. 5, 1960

2,920,306

CORRELATOR FOR ZERO CROSSING PULSES OBTAINED FROM SEISMOGRAMS

Frank J. Feagin and Carl R. Wischmeyer, Houston, Tex., assignors, by mesne assignments, to Jersey Production Research Company, Tulsa, Okla., a corporation of Delaware Application April 12, 1954, Serial No. 422,487

8 Claims. (Cl. 340—15)

This invention relates to geophysical prospecting and to a method and apparatus for obtaining objective interpretations, based on rationally established criteria, of complex geophysical data containing both useful and irrelevant information. More particularly, this invention relates to a method and apparatus for electrically correlating a plurality of traces representing complex geophysical data which have been recorded.

Geophysical prospecting is concerned primarily with the problem of locating and determining the nature of geologic structures which are buried far below the surface of the earth. There are a number of geophysical prospecting methods each concerned with the measurement of a particular physical property of the earth and the interpretation of said measurements. Since the problem is to locate geological structures, it is necessary to carry out the measurements at points distributed over wide areas of the earth's surface. The information obtained at each of these observation points must then be compared or correlated with the information from the other points before an over-all interpretation of the data can be made. In general the geophysical information obtained during prospecting operations is of enormous complexity and contains a large proportion of extraneous, or noise, components which make the interpretation of such data a formidable task. In many instances it is virtually impossible to separate the useful from the extraneous components of the data, and it frequently occurs that two or more equally skilled interpreters arrive at different conclusions regarding the meaning of the data. It is apparent, therefore, that a need exists for more refined methods of geophysical interpretation.

Where geophysical investigations are conducted by means of instruments lowered into holes drilled in the earth, as in electrical logging, radioactivity logging, dipmeter logging, and the like, it is necessary to compare the well logs obtained in a number of holes in a particular area so as to obtain an indication of the depths of a particular geological formation at the various borehole sites. The practice has been to examine the well logs visually in an effort to associate a characteristic variation or "kick" in the measured quantity with a particular geologic formation. If such a correlation can be made using the logs obtained in wells distributed over an area, it is possible, of course, to map the subsurface structure with reasonable accuracy. In many cases, however, the appearance of the same formation on well logs from scattered wells will vary widely as a result of certain changes in the formation itself and it requires great skill properly to interpret the logs and to correlate formations from well to well.

In the case of wildcat wells it is very desirable to obtain information about the subsurface structures, but there being no other wells in the vicinity it is not possible to compile the data from a number of separate well logs. To meet this problem special well logging devices known as dipmeters have been developed, which are intended to provide structural information about the subsurface from the single borehole. These devices operate by locating the interface between two particular formations at several points around the periphery of the borehole. If the interface is shown to intersect the borehole wall a fraction of an inch higher on one side of the hole than on the other, this may be interpreted as meaning that the subsurface formations lie at an angle with respect to the horizontal. In practice at least three indications of the interface are obtained around the sides of the borehole and from the positions of these three points the plane marking the interface between the particular two formations is calculated. Here again, the problem concerns the separation of extraneous indications from those which are significant. For example, in the caliper type dipmeter, three arms extend outwardly from the instrument and bear against the wall of the borehole. The amount of extension of each arm is recorded continuously at the surface thereby drawing a miniature profile of the borehole wall at three azimuths. The interface between a relatively hard and a soft formation is indicated by a point where the profile suddenly changes from normal or bit size to a relatively greater diameter. Actually, the wall of a borehole is quite irregular, not only because of variations in hardness but also because of many random effects which occur during the drilling operation. Here again is a situation where the useful information is clouded and confused by a large amount of "noise" which can contribute nothing to the determination of the dip of the formations. It has been found necessary, therefore, to consider not individual interfaces or washouts on the caliper-type dipmeter records but, instead, to consider 30 to 50 foot sections of the logs and to attempt to find the displacement of the three profiles with respect to each other which results in the best fit or the highest correlation. In holes which have many irregular washes and in which strong contrasts in hardness do not occur the interpretation of dipmeter logs is exceedingly difficult, and different human computers may easily arrive at different conclusions as to the actual subsurface conditions.

Seismic prospecting, as practiced today, consists essentially of the steps of initiating a disturbance at a known point in the earth's crust and recording the resulting earth motion at a number of spaced detector stations. These recordings usually take the form of a plurality of galvanometer traces positioned side by side on a strip of photographic paper. These recordings are examined visually, and if particular seismic events on the recording can be identified as reflections from subsurface beds and if the seismic velocity of the subsurface material is known, it becomes a relatively straightforward problem in geometry to calculate the depth of a reflecting interface and its angle of dip. Most of the problems associated with seismic prospecting are not related to the calculations but are concerned with the identification on the seismogram of those seismic events to which the computations may be applied. Unfortunately, the firing of an explosive charge in a borehole does not produce a simple motion of the earth's crust. On the contrary, the resulting seismic disturbance is a thing of great complexity. Energy is radiated in all directions thus wasting, from the geophysicist's standpoint, all the energy put into the ground except for the minute amount which travels downward in a particular direction. Also, the explosion creates different types of wave motion which behave differently in traveling through the earth's crust and which travel with different velocities. Some of the energy appears as surface waves which cause relatively large signals at the geophones but which carry no useful information. Further to complicate the situation, the medium through which the waves are propagated, the earth, is a body of almost unparalleled complexity with inhomogeneities occurring in all of its physical constants even within a relatively small volume. All of these factors operate to complicate the problem of seismic prospecting so that even in a relatively "good" area a record obtained with a single geophone and recording system would defy interpretation; and it would be most difficult, if not impossible, to identify any particular wave on the record as a reflection.

Over the past 20 years the progress of seismic prospecting has been marked by a succession of techniques for separating the received seismic signal into that part yielding useful information which might be termed the message and the residue which has been termed noise. One of the earliest steps taken to accentuate the useful portion of the signal was a separation on a frequency basis. It was found that for any particular area the useful information was contained in a relatively narrow frequency band. Band-pass filters were therefore utilized to increase the intelligibility of the record or to improve the message-to-noise ratio. While this technique of separating message from noise on a frequency basis made the identification of reflected energy easier, it was still a formidable task, and other expedients were applied. Instead of using a single geophone to record the earth motion, a number of geophones were laid out, usually along a line extending from the shot point, each feeding a separate recording channel. While any single geophone signal obtained in this way was no more informative than previously, it was found that reflections could be identified with much more certainty, for reflections could be expected to appear on the various traces with a distinct and identifiable time delay. Technique utilizing this characteristic amounts to a separation of the message from the noise on a direction-of-arrival basis. Just as a reduction in frequency band width to a point results in an improved message-to-noise ratio, so also a more and more directional receiver, if properly oriented with respect to the path of arrival of the signal may improve the message-to-noise ratio. More recently the utilization of this "directional receiver" technique in seismic prospecting has been extended by the use of large clusters of geophones laid out in such patterns as to accentuate seismic waves, within certain frequency limits, which arrive from a vertical or near vertical direction.

At the present stage of the seismic prospecting art, therefore, the problem of improving the message-to-noise ratio has been attacked by applying two separation processes: one on a frequency basis and one on a direction-of-arrival basis. These methods have been of material assistance to exploration geophysics, but present techniques still leave much to be desired. In certain areas, using all available methods, records are still obtained on which the most experienced human computers are unable to identify reflections. In a recent paper which appeared in volume XVI, page 450, of Geophysics, a study is presented of the ability of typical computers to identify reflections in the presence of known amounts of noise. Working from synthetic records, it was concluded that with conventional multitrace presentation, the number of correctly identified reflections was directly related to the message-to-noise ratio. Below about zero db message-to-noise ratio, it was found to be impossible to distinguish consistently the reflected events. Unfortunately, many records are still obtained which have message-to-noise ratios lower than this value. It thus becomes pertinent to consider other ways of detecting the correlation of reflected events among the traces of a seismogram.

The purpose of all the foregoing methods of geophysical interpretation is to discover the depths, at various points, at which similar characteristic messages appear on the record. Knowing said depths, the dip of the lithologic formation which exhibits said characteristic message can be determined. The computing methods currently in use are ineffective when applied to highly complex data. Expert computers often disagree as to the correct interpretation to be applied to particular data. Indeed, the data are so complex as not to be subject to interpretation by expert computers.

It is an object, therefore, of this invention to provide a method and apparatus for the interpretation of geophysical data which is not subject to the limitations of human computers.

It is a further object of this invention to provide a method and apparatus for quickly and easily interpreting geophysical data which are so complex that it is impossible for a human computer to interpret said data.

It is a further object of this invention to provide a method and apparatus for separating the useful from the extraneous components present in geophysical data and for providing a quality rating of the data by which the reliability of the interpretation may be determined.

It is a further object of this invention to provide a method and apparatus for correlating a set of recorded data.

Briefly described, our method consists of, first, detecting a physical property of the earth at a plurality of spaced points and recording individually the quantities so detected. The quantities may be recorded as a function of depth, as in electrical logging or dipmeter logging, or as a function of time, as in seismic prospecting, with time indicating depth. Portions of the quantities recorded may then, for example, be transcribed onto a magnetic recording drum. By means of an electronic circuit, the recordings played back from the magnetic drum may be converted into a secondary electrical signal having a pulse at each of certain salient points, for example, the positive or negative peaks or the zero values of the recordings or any combination thereof. The pulses of each secondary electrical signal are shifted with respect to the other secondary electrical signals until the "best fit," which may be indicated by an extreme value of an electrical indicator, is obtained. The particular displacement which produced the extreme value is then converted and expressed in terms of geological structure.

The invention will be more readily understood from a reading of the attached specification and drawings wherein.

Figure 1:
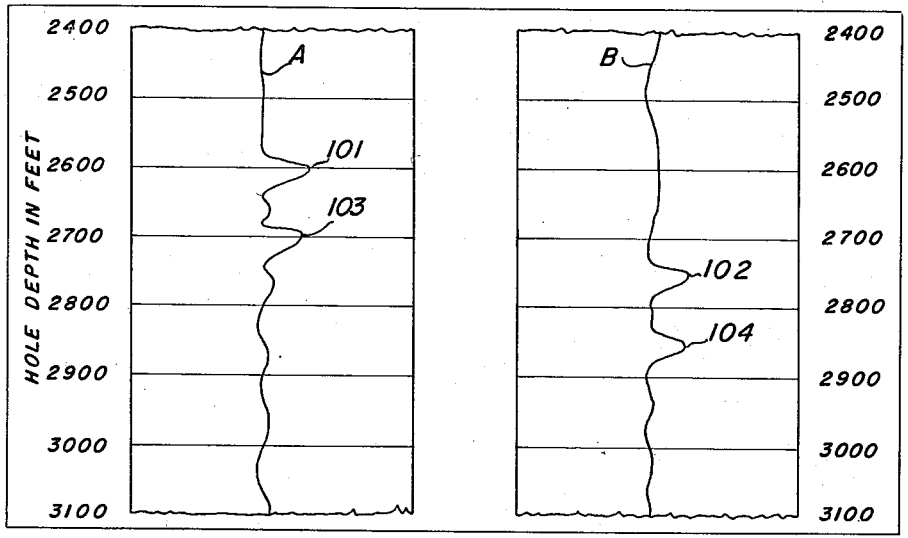
Fig. 1 shows an electrical resistivity log taken at two spaced locations.

As has been pointed out, many geophysical operations involve making physical measurements as a function of some independent variable such as time, or depth. Such measurements are a mixture of information which is geologically significant and variations which are not geologically significant. In practice such measurements are made at a plurality of locations. A fundamental problem is to separate the significant information (or "message") from the non-significant variations (or "noise"). If there were no significant change in the geological conditions between two locations, the significant part of the measurement, the "message" would be the same; any difference would thus be solely in the "noise." In general, the differences in the "noise" between the two locations may be expected to vary with the independent variable in a random manner. However, a change in depth of a group of strata produces a systematic shift of the portion of the "message" corresponding to that group of strata without an equivalent systematic shift in the noise. Thus it is possible to make the best estimate of the shift in the geological group of strata by determining the shift required to give the best fit between the measurements.

It thus appears to be a promising approach to consider the part of the signal which, after certain corrections have been applied, correlates from signal to signal with a determinable displacement between adjacent signals to be message and to consider the residue to be noise.

For ease of handling, it is advisable to use mathematical expressions for the above. Let:

$\tau$ = the displacement
$f(t)$ = signal
$g(t)$ = message
$e(t)$ = noise

The expression for the first signal is:

$$f_1(t) = g_1(t) + e_1(t)$$

or $$e_1(t) = f_1(t) - g_1(t) \quad (1)$$

and for the second signal:

$$f_2(t) = g_2(t) + e_2(t) \quad (2)$$

Except for the displacement, $g_1(t)$ and $g_2(t)$ are the same; thus $$g_2(t) = g_1(t+\tau)$$

or $$f_2(t) = g_1(t+\tau) + e_2(t)$$

or $$g_1(t) = f_2(t-\tau) - e_2(t-\tau)$$

or $$e_2(t-\tau) = f_2(t-\tau) - g_1(t) \quad (3)$$

Having arrived at the above expressions, one may next choose a definition of the closeness of fit for matching the messages as they appear in each individual signal. By analogy to the familiar criterion of fitting curves to experimental data by "least squares," one suitable definition of a criterion of the closeness of fit would be based on the squared differences between each signal and the message, $g(t)$. The use of the "least squares" method for curve fitting in this case would be to find $\tau$ and a function $g(t)$, of the independent variable, such that the average of the sum of the squares of the differences between $g(t)$ and each of the two measurements is a minimum when the second measurement is shifted by $\tau$. When one uses the average of the sum of the squares of the differences as the measure of the error, it can be shown that the best values of $g(t)$ is the average of the original measurements with the second shifted by an amount $\tau$.

Hence, the average over an appropriate interval of the sums of the squares of the right hand members of Equations 1 and 3 can be used as the criterion of closeness of fit. To simplify the explanation of the derivation of the criterion for closeness of fit, it has been assumed that only two traces or measurements are to be correlated. However, the formulation can readily be extended to any number of locations or sets of measurements. If $n$ traces are to be correlated, the criterion becomes $$\Sigma[f_n(t-[n-1]\tau) - g(t)]^2$$

averages for values of depth (or time) over a desired interval 2T on each signal; it then takes the form $$D(\tau) = \frac{1}{2T} \int_{-t}^{+t} \Sigma[f_n(t-[n-1]\tau) - g(t)]^2 dt$$

where $D(\tau)$ is an indication of the overall "closeness of fit" of all the signals and the smaller $D(\tau)$, the better the fit. It may be seen, therefore, that if it were possible to compare all the traces or sets of measurements for all possible values of $\tau$ and to select the value $\tau$ yielding the minimum value of $D(\tau)$, the result would be the "best" correlation as defined above.

The above procedure is by no means the only one which can be used to apply the principles of our invention to the interpretation of geophysical data.

Another criterion for the best fit of two curves is based on the so-called "cross correlation" function. It can be demonstrated mathematically that the "cross correlation" function is derived from "least squares." Essentially the method of "cross correlation" consists of multiplying a function of an independent variable, such as depth or time, by a second related function of the same independent variable shifted by an interval $\tau$. If a curve is plotted on the average of the product of the two functions, one function being shifted by an amount $\tau$, for all $\tau$'s, the maximum or minimum point on the curve, depending upon whether the cross products are positive or negative in sign, respectively, represents the value of $\tau$ at which there is optimum correlation.

A third criterion for the best fit of two curves is based on the "absolute" difference rather than on the "squared" difference between the curves. When this criterion is used, the "best fit" is achieved when the average of the absolute value of the difference is a minimum.

Figure 2:
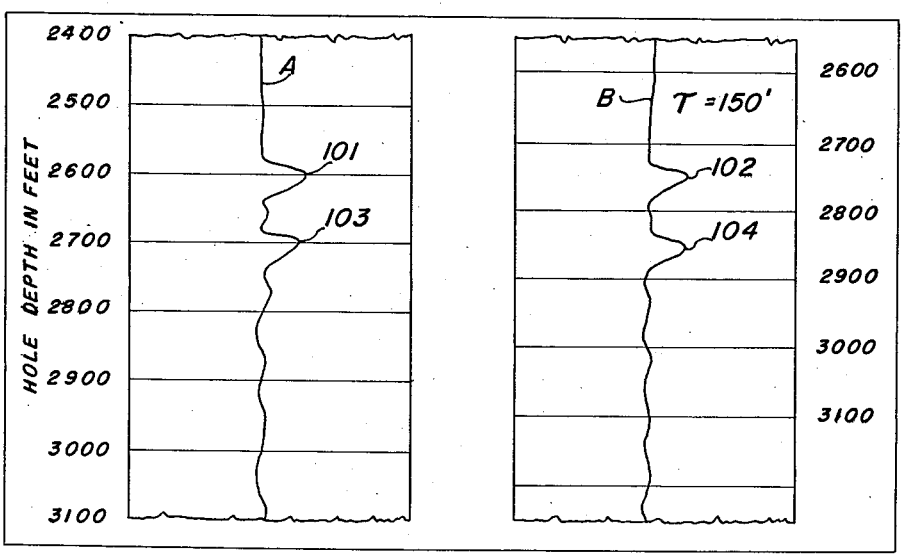
Fig. 2 shows the resistivity logs of Fig. 1, with the log of one location shifted so as to be correlated with the log taken at the second location.

In order to understand the application of the aforementioned principles to a detailed method of interpretation consider Fig. 1 which represents what might be termed an ideal electrical log of two spaced-apart locations. The points 101 and 102 indicate a characteristic resistivity signal peculiar to a particular type of lithologic stratum. Points 103, 104 indicate a characteristic signal peculiar to another type of lithologic stratum. Fig. 2 shows the shift of log B with respect to A of 150 feet which yields the "best fit." From a knowledge of the amount of shift required for the "best fit," the depths of a particular stratum at each of the two locations are determined and consequently the amount of dip of said stratum can be ascertained. This procedure can be used to correlate any number of resistivity logs. In actual practice, however, the logs obtained are often so complex, because of noise, that the characteristic signal is obscure when the logs are interpreted by a human computer. It is in the correlation of such highly complex signals that our invention has its greatest utility. In order to apply the principles of our invention to this problem, it is first necessary to record the signals in some readily reproduceable form, preferably in a form which may be used to generate repetitive electrical signals corresponding to the individual traces or to portions of individual traces. A preferred means of doing this would be through the use of magnetic recording. The individual signals may be recorded side by side on a magnetic tape or drum with a suitable record-reproduce magnetic head associated with each trace.

Though the resistivity logs of Fig. 1 and Fig. 2 show only two traces, it is understood that any number of traces can be correlated in a similar manner. Also, the recorded traces need not necessarily be resistivity logs but may be representative of any other physical property of the subsurface strata. For example, seismic information, if desired, may be recorded on the magnetic drum.

Figs. 3, 4, 5, and 6 are examples in schematic fashion showing how such a magnetic drum would be used subsequent to the recording of seismic information thereon, The magnetic drum 120 is driven at constant speed by a motor 121. Arranged around the outer surface of the drum are a plurality of magnetic heads 122 which may be either movable or fixed, as indicated. It may be seen, therefore, that each track on the drum will represent one trace of a geophysical data record. Also using well known recording techniques, the electrical signal from these pickup heads, after suitable equalization, will be an electrical analogue of the associated geophysical data trace.

In certain types of geophysical and other data a significantly large part of the information content lies in the time of occurrence of salient features of the record, such as zero crossings, steep rises, positive and negative crest values and the like. Accordingly, if each trace of the reproduced geophysical data is fed to a device which we shall call a "signal encoder," the function of which is to produce an output of a prearranged waveform, such as a trigger pulse or a rectangular pulse, at such time that its input contains one or another of the previously mentioned salient features of the record, there results an encoded output containing accurate information on time of occurrence of such salient features. For example, with seismic data a trigger pulse of given polarity may be generated each time the seismic signal passes through zero. Or, alternatively, a positive trigger pulse may be generated by the passage of a seismic signal through zero from minus to plus, and a negative trigger pulse may be generated by the passage through zero from plus to minus. Similarly, crest values of the original data, which become zeroes upon differentiation, may be marked by trigger pulses, either without regard to the polarity of the crest value or by using a trigger pulse of one polarity for a crest of one sense and a trigger pulse of opposite polarity for a crest of the other sense.

With a large part of the useful information of the original signal appropriately encoded as trigger pulses or rectangular pulses, all the techniques applicable to the handling of pulses may be applied. In general, it may be said that operations on the resulting pulse-coded data may be accomplished more easily and in more different ways than similar operations on the original data. Further, it is observed that the result of delaying the original signal by an amount $\tau$ and then encoding yields the same output pulses for any given signal and encoding system as first encoding and then delaying the resulting pulses by an amount $\tau$.

Figure 3:
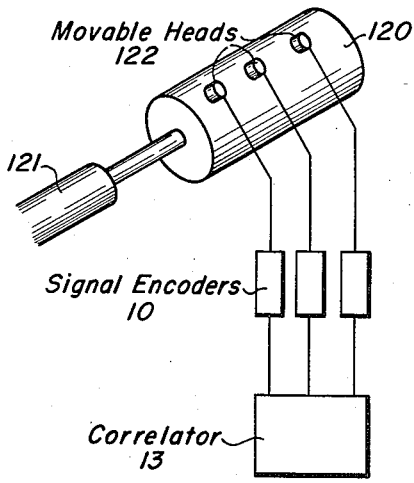
Fig. 3 is a diagram partly schematic and partly in block form representing one example of the general arrangement of our invention.

Referring to the system shown in Fig. 3, the electrical signals from movable pick-up heads 122, after suitable amplification and frequency equalization, are fed to signal encoder circuits 10 which produce outputs consisting of rectangular pulses of fixed, predetermined suitable duration for use as input to the correlator 13. Alternatively the pulse length may be that between the event initiating the pulses and the next succeeding event. Even-numbered events turn the pulse-generating mechanism on, and odd-numbered events turn the same off, the net effect being quite similar to that of clipping the applied waveform. Variation of $\tau$ and application of corrections is achieved by moving the heads.

Figure 4:
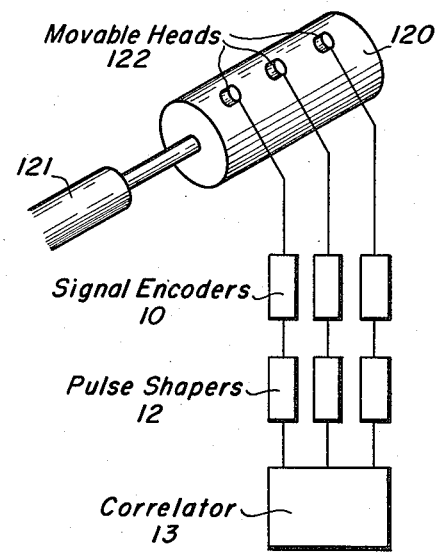
Fig. 4 is a diagram partly schematic and partly in block form showing a second embodiment of our invention.

Referring to the system of Fig. 4, operation of the signal encoders differs from that of Fig. 3 in that the outputs are in the form of trigger pulses of accurate timing but not of suitable duration for correlation. Accordingly, in the pulse shapers 12, trigger pulses are used to initiate the action of a one-shot multivibrator or the like to deliver, as output, pulses of uniform length suitable for input to the correlator 13. Variation of $\tau$ and the application of corrections is achieved by moving the heads.

Figure 5:
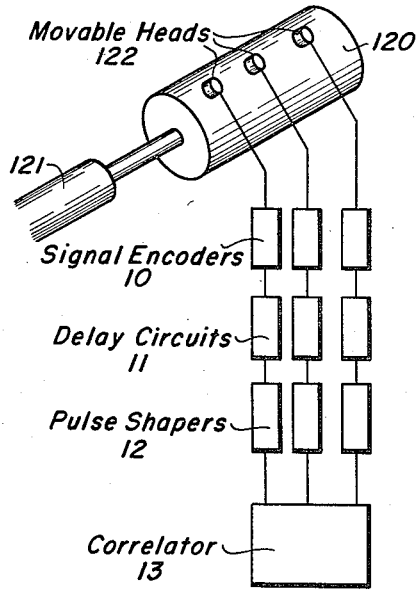
Fig. 5 is a diagram partly schematic and partly in block form showing a third embodiment of our invention.

Referring to the system of Fig. 5, operation is similar to that described for Fig. 4 except that electrical means, such as delay multivibrators, phantastrons, or delay lines, are provided to insert independently adjustable or controllable delay into the several channels. A phantastron is a type of circuit which may be used to secure stable accurately controlled delay times, applicable particularly in pulse circuitry. See book entitled "Waveforms" by Chance, Hughes, MacNichol, Sayre, and Williams, vol. 19, pages 195–204, M. I. T. Radiation Laboratory Series, McGraw-Hill, New York (1949). The individually movable heads and the individually adjustable delay circuits 11 afford the possibility of introducing corrections and the correlation variable $\tau$ in either of two ways. For example, if the traces on the drum are seismic traces, the "step-out" correction may be applied by moving the movable heads while $\tau$ is varied by adjusting the delay circuits or vice versa.

Figure 6:
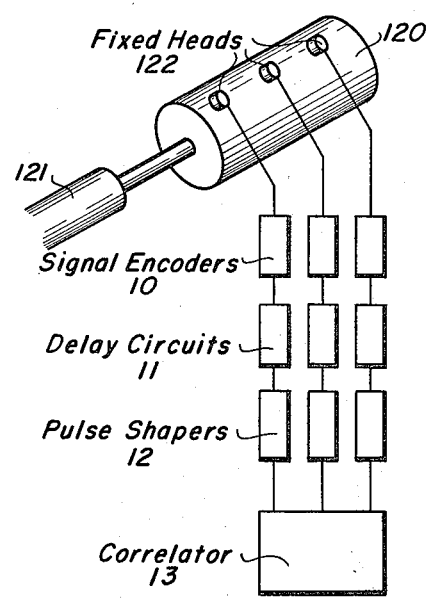
Fig. 6 is a diagram partly schematic and partly in block form showing still another embodiment of our invention.

Referring to the system of Fig. 6, operation is similar to that described for Fig. 5, except that, with the fixed heads 122, corrections together with the correlation variable $\tau$ are introduced by the delay circuits 11.

The operation of this invention in the manner of the systems of Figs. 3, 4, 5, and 6 includes a "correlator" 13, which may operate in various ways depending basically upon the choice of criterion of "best fit." Several examples follow.

Figure 7:
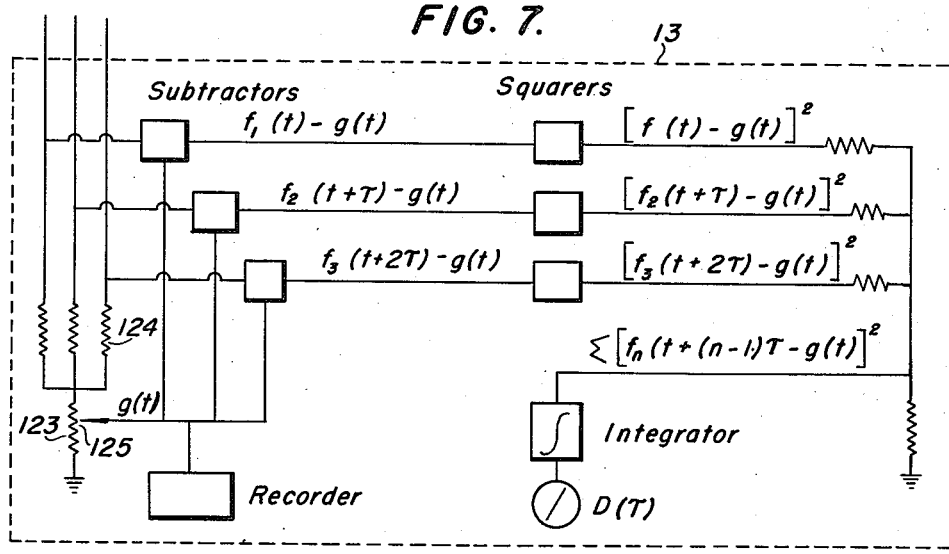
Fig. 7 is a diagram partly schematic and partly in block form representing generally one form of correlator for determining the "best fit"

As shown in Fig. 7, the several signals are added in the potentiometer 123. Isolation resistors 124 are provided to reduce interaction between the channels. As shown in Fig. 7, the sum of the signals, which appears across resistor 123 may be considered the message times $n$. By properly positioning the tap 125 of the potentiometer 123, the sum of the signals is divided by $n$, thus yielding the message $g(t)$. This quantity $g(t)$ may be recorded so as to produce a permanent record of the message. However, this quantity $g(t)$ is of special value when the time delay $\tau$ between the recording channels is correctly chosen to give the best fit. It is the determination of the correct value of $\tau$ which is the function of the apparatus shown in Fig. 7.

The following steps are followed:
(1) An arbitrary value of $\tau$ is applied.
(2) The signals are added electrically and the result divided by the number of signals, which gives $g(t)$.
(3) The value of $g(t)$ is electrically subtracted from each individual signal.
(4) The $n$ differences so obtained must be applied separately to $n$ electrical squaring circuits.
(5) The $n$ squared quantities are added together and averaged by some such device such as a D.-C. voltmeter. The output of the averaging device then represents $D(\tau)$.
(6) $\tau$ is varied over the range of expected values until the value of $\tau$ is found which makes $D(\tau)$ a minimum.
(7) Using this value for the correct $\tau$, a permanent recording is made of $g(t)$ which corresponds to the message.

It should be noted that this procedure yields three kinds of information, first, the message itself, $g(t)$ and, second, $D(\tau)$, which might be considered a quality rating or a measure of the degree of correlation found between the signals, and third, the specific $\tau$ at which $D(\tau)$ is a minimum.

Returning now to Fig. 7, it may be seen that the above steps are accomplished by subtracting $g(t)$, obtained as previously described, from each individual signal. Each of the resulting differences is fed into a squaring circuit and the resulting quantities are added and averaged over a suitable time interval to obtain $D(\gamma)$.

Figure 8:
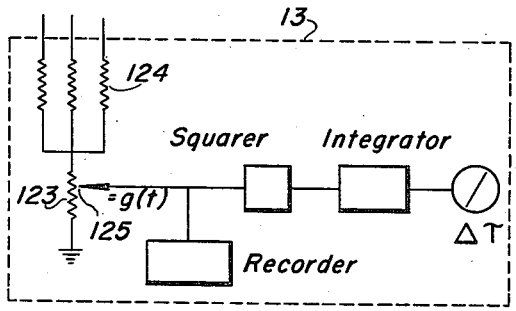
Fig. 8 is a block diagram showing another form of correlator.

Fig. 8 shows diagrammatically an electronic device for carrying out our method using the cross-correlation criterion. It may be seen that the message $g(t)$ is obtained in exactly the same manner as described in connection with Fig. 7. However, the remainder of the circuit is much less complex than that in Fig. 7. It is necessary to have only one squaring circuit in Fig. 8 whereas the former device required one squarer for each signal. This is a difference of some consequence when it is noted that in seismic prospecting 24 or more signals may be employed. It is true, of course, that the device of Fig. 7 is more fundamental in that is applies the arbitrary least square criterion with precision. However, if the integration is taken over a sufficiently long interval the two devices will produce identical results. Expressed in terms of the analogue electrical quantities, this amounts to saying that the results will be identical if in each case the length of record being correlated is made long enough that the average power remains approximately constant with variations in $\tau$. If it is desired to use the "absolute" difference criterion, a linear rectifier, which has an output proportional to the absolute value of the inputs, can be substituted for the "squarer" in Fig. 7.

Figure 9:
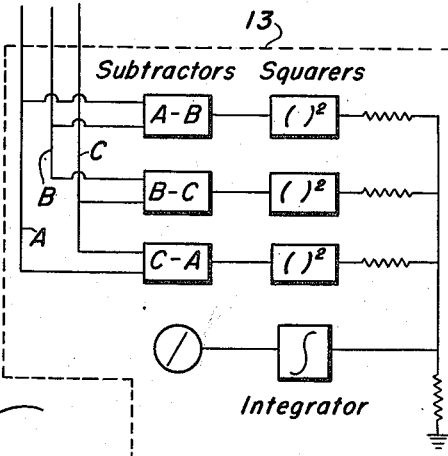
Fig. 9 is a block diagram showing still another form of correlator.
Figure 10:
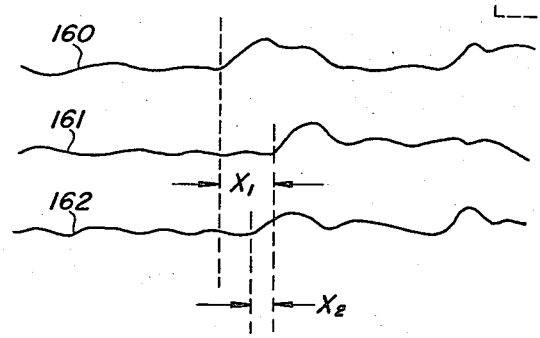
Fig. 10 shows a typical caliper-type dipmeter log.

A very similar method and apparatus can be used to assist in the interpretation of well logs. Such techniques can be applied to the correlation of well logs made in a number of boreholes located over a particular area. Our method is also very useful in connection with the interpretation of caliper-type dipmeter logs of the type described above. Fig. 10 shows a typical dipmeter log with the orientation information omitted for clarity. Traces 160, 161 and 162 represent the profiles of the borehole wall traced by the three caliper arms. The problem in interpreting this log is that of determining the shift of the three traces which results in the best fit among them. In the case shown, the two displacements are designated as $X_1$ and $X_2$. When these two distances have been established, knowing the diameter of the borehole and the scale factor between distances in the hole and on the traces, it becomes possible to establish the dip angle of the subsurface formations. In cases where the washouts correspond closely on the three traces it is relatively simple to establish the proper displacements by visual inspection. In many holes, however, the correlation between traces is poor, and even the most skillful interpreters are unable to fix the displacements with certainty. By using the method disclosed herein such determinations may be made quickly and objectively. Fig. 9 shows schematically a device which may be used for this purpose. The least square criterion could be employed or, alternatively, the cross-correlation function criterion. Fig. 9 employs the relationship set out in the cross-correlation function. Using the letters A, B and C to represent generally the signals obtained from dipmeter profile arms 1, 2 and 3, respectively, the operation amounts to the evaluation of $$\frac{1}{2T}\int_{-T}^{T}[(A-B)^2+(B-C)^2+(C-A)^2]dt$$

As with the previously described devices, the signals are first transcribed onto a magnetic recording drum 120 with each recording track having an associated reproduce head. Because of the great length of most dipmeter logs, it will usually be desirable to record only a portion on the drum at one time. Unlike the seismic case, the actual message has no great significance in the interpretation of the dipmeter logs, although it might be noted as an indication of the hole diameter. In Fig. 9 the three differences are then taken, which may be done simply by adding the signals with appropriate reversals of polarity. The differences are then squared in circuits of the diode or the thermal type and added in a potentiometer. This sum is then passed to an integrator such as a D.-C. voltmeter. With the interpretation of dipmeter logs there is no single quantity $\tau$, such as was encountered with the seismic application but instead two independent displacements $X_1$ and $X_2$ must be determined independently. In practice this may be done easily by adjusting one delay circuit for a minimum indication and then following a similar procedure for another delay circuit. The minimum value so obtained may be recorded as a quality rating of the degree of correlation. Since the amount and direction of dip may change as a function of depth, there will be some optimum interval over which to make the correlation. If the interval is chosen to be too great, the changes in the actual dip with depth may adversely affect the correlation; or the twist of the dipmeter about its axis as a result of torsional forces in the supporting cable may likewise reduce the correlation. On the other hand, the choice of too short an interval may place too great emphasis on small erratic borehole irregularities and prevents integration over large enough intervals. The best interval for correlation may be determined by applying a gate circuit to the output of the pickup heads so that the interval considered may be expanded or shortened until the lowest minimum value obtained indicates that the optimum interval has been reached.

For the most part, the particular circuits used in our interpreting device are non-critical and their designs are well within the capabilities of the skilled electronic worker.

Though our invention has been described in terms of its usefulness in the interpretation of geophysical data, its utility is not limited to use in interpreting geophysical data. Our invention may be used to correlate any number of curves, regardless of the type of data which the curves represent. Also, though only a few traces are considered in the description of our new invention, it is to be clearly understood that any number of traces may be correlated. In seismic work there may be as many as 24 traces.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is.

1. A method of correlating a plurality of recorded traces comprising the steps of: reproducing said plurality of traces as primary electrical signals; converting each of said primary electrical signals into a secondary electrical signal, said secondary electrical signal consisting of pulses of sufficient duration to permit correlation and representing salient points of the primary electrical signal from which it is produced; producing, according to a pre-established criterion for the degree of closeness of fit of said plurality of secondary electrical signals, an electrical indication; and shifting the positions of each of said plurality of secondary electrical signals the required amount to obtain an extreme value of said electrical indication, thereby obtaining an indication of the best fit of said plurality of secondary electrical signals.

2. A method of correlating a plurality of traces recorded on a rotatable magnetic drum having electromagnetically associated therewith a plurality of magnetic heads comprising the steps of: revolving said magnetic drum at a constant speed; reproducing said plurality of traces into primary electrical signals by means of said plurality of magnetic heads; converting each of said primary electrical signals into a secondary electrical signal consisting of pulses of sufficient duration to permit correlation and representing salient points of the primary electrical signal from which the secondary pulse is produced; producing, according to a pre-established criterion for the degree of closeness of fit of said plurality of secondary electrical signals, an electrical indication; and shifting the relative positions of said plurality of secondary electrical signals until an extreme value of said electrical indication indicates the best fit of said plurality of secondary electrical signals.

3. The method as described in claim 2 wherein the shifting of the relative positions of said secondary electrical signals includes the step of changing the positions of said plurality of magnetic heads.

4. The method as described in claim 2 wherein the shifting of the relative positions of said secondary electrical signals includes the step of passing said secondary electrical signals through delay circuits, one delay circuit for each secondary electrical signal.

5. A system for correlating a plurality of recorded traces including: a plurality of movable means for reproducing said plurality of traces as electrical signals; means for conducting said electrical signals to signal encoders to thereby produce secondary electrical signals consisting of rectangular pulses of sufficient duration to permit their correlation; means for determining the best fit of said secondary electrical signals; and electrical conducting means interconnecting said encoders and said best fit determining means.

6. A system for correlating a plurality of recorded complex traces including: a plurality of movable means for reproducing said plurality of traces as electrical signals including all frequencies present in said recorded complex traces; means for conducting said electrical signals to signal encoders to thereby produce electrical pulses of sufficient duration to permit their correlation, the frequencies of said pulses including all the frequencies present in said complex traces; means for determining the best fit of said secondary electrical signals; and electrical conducting means interconnecting said encoders and said best fit determining means.

7. A system for correlating a plurality of recorded traces including: a plurality of means for reproducing said plurality of traces as electrical signals; means for conducting said electrical signals to an electrical arrangement for producing secondary electrical signals representing salient points of said electrical signals and of sufficient duration to permit their correlation, said electrical arrangement including electrical circuits for producing trigger pulses representing said salient points, signal delaying means for receiving said trigger pulses, each signal delaying means being separately and independently adjustable, and electrical circuits for receiving pulses from the delaying means and producing rectangular pulses representing the same salient points; means for determining the best fit of said secondary electrical signals; and electrical conducting means interconnecting said electrical arrangement and said best fit determining means.

8. A system for correlating a plurality of recorded traces including: a plurality of movable means for reproducing said plurality of traces as electrical signals; means for conducting each of said electrical signals to an electrical circuit for producing trigger pulses representing salient points of said electrical signals; electrical circuits for receiving the trigger pulses and producing rectangular pulses representing the same salient points; means for determining the best fit of said rectangular pulses; and electrical conducting means interconnecting said rectangular pulse producing means and said best fit determining means.

References Cited in the file of this patent

UNITED STATES PATENTS

| | | |
|---|---|---|
| 2,161,764 | Minton | June 6, 1939 |
| 2,276,423 | Silverman | Mar. 17, 1942 |
| 2,427,421 | Rieber | Sept. 16, 1947 |
| 2,440,971 | Palmer | May 4, 1948 |
| 2,539,220 | Athy et al. | Jan. 23, 1951 |
| 2,578,133 | Hawkins | Dec. 11, 1951 |
| 2,588,717 | Goodwin | Mar. 11, 1952 |
| 2,620,890 | Lee et al. | Dec. 9, 1952 |
| 2,640,275 | Boucher | June 2, 1953 |
| 2,688,124 | Doty | Aug. 31, 1954 |
| 2,693,908 | Favre | Nov. 9, 1954 |
| 2,767,388 | Rust | Oct. 16, 1956 |
| 2,779,428 | Silverman | Jan. 29, 1957 |
| 2,791,288 | Meier | May 7, 1957 |